Dec. 22, 1959  A. W. LAUER, JR  2,918,081
FLUID PRESSURE CONTROL DEVICE
Filed Feb. 9, 1954  3 Sheets-Sheet 2

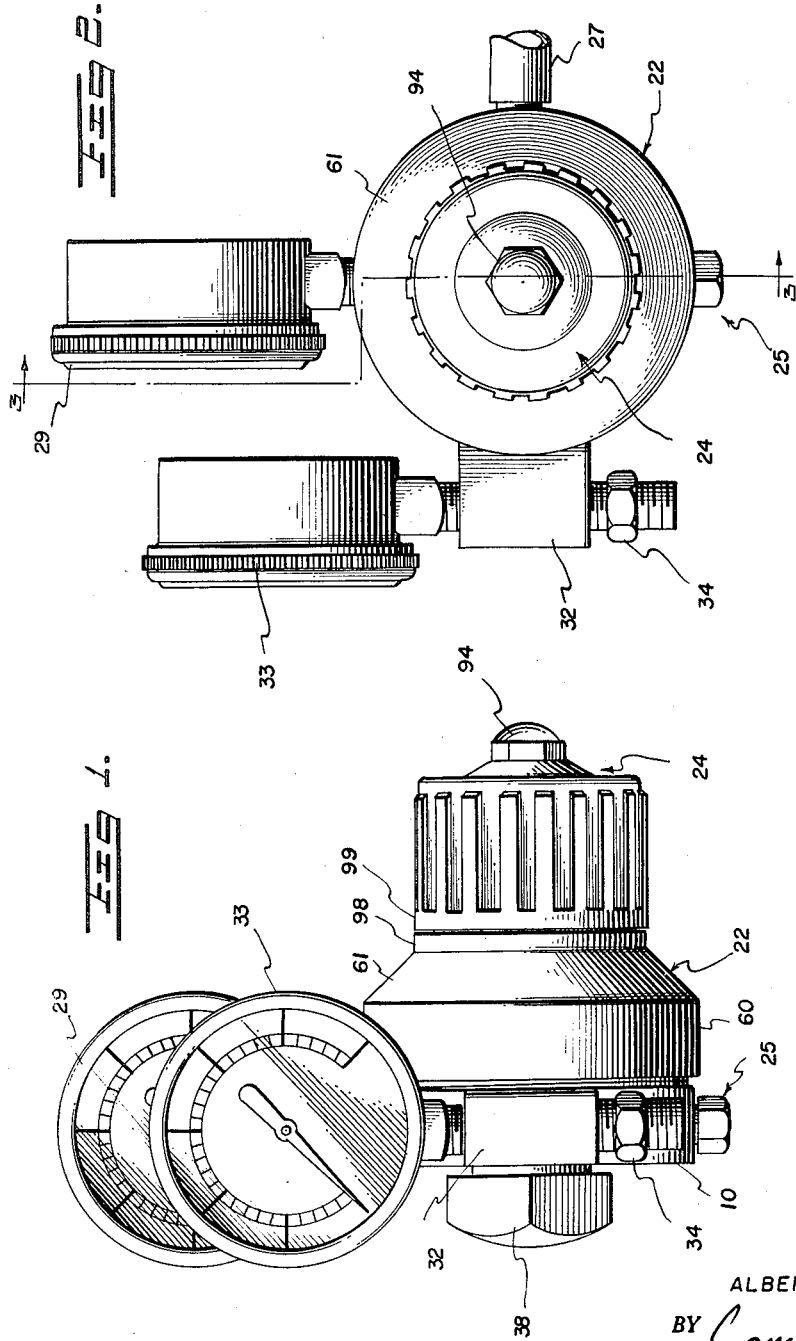

INVENTOR
ALBERT W. LAUER, JR.

BY

ATTORNEY

Dec. 22, 1959 A. W. LAUER, JR 2,918,081
FLUID PRESSURE CONTROL DEVICE
Filed Feb. 9, 1954 3 Sheets-Sheet 3

INVENTOR
ALBERT W. LAUER, JR.

BY *James J. Shanley*

ATTORNEY

United States Patent Office 2,918,081
Patented Dec. 22, 1959

2,918,081

FLUID PRESSURE CONTROL DEVICE

Albert W. Lauer, Jr., Emmaus, Pa., assignor to Air Products Incorporated, a corporation of Michigan Application February 9, 1954, Serial No. 409,191

1 Claim. (Cl. 137—505.11)

This invention relates to fluid pressure control devices, and more particularly to control devices of the type operable in accordance with a manually applied function, such as a fluid pressure regulator including a manually operable control knob for adjustably determining the pressure to be maintained.

It is an object of the present invention to provide a fluid pressure control device including manually operable controlling means of novel construction operable for transmitting a manual function with greater accuracy and ease.

Another object is to provide a fluid pressure control device of the type operable in accordance with a manually applied function which comprises a casing for housing a fluid pressure controlling means, a hand engageable means without the casing and a novel mechanism for coupling the fluid pressure controlling means and the hand engaging means so that a manual function applied to the hand engaging means is transmitted accurately to the fluid pressure controlling means with greater ease and with improved reliability.

Another object is to provide a fluid pressure control device of the above type in which the hand engaging means is a controlled knob of the non-rising type, and anti-friction means are provided for rendering easy and precisional operation.

Another object is to provide a fluid pressure control device of the foregoing character including a novel arrangement for limiting the range of the manually applied function.

Still another object of the present invention is to provide a fluid pressure control device of the type operable in accordance with a manually applied function which comprises a casing for housing a fluid pressure controlling means, a hand engageable means without the casing and a novel mechanism coupling the fluid pressure controlling means and the hand engaging means so that a manual function applied to the hand engaging means is transmitted accurately to the fluid pressure controlling means, in which the hand engageable means comprises a single control knob of cup-shape which extends over a portion of the casing in overlying relation, the portion of the casing enclosed by the cup-shaped control knob comprising a housing for a portion of the coupling mechanism.

Still another object is to provide a fluid pressure control device of the above character in which the cup-shaped control knob provides an unusually large hand gripping area relative to the size of the casing and affords easy accurate operation.

A still further object of the invention is to provide a fluid pressure control device of the foregoing character including a cylindrical casing and a cup-shaped control knob of a diameter less than the diameter of the casing positioned concentrically of the casing with the cup-shaped control knob overlying a portion of the casing of reduced cross-sectional area, the overlying portion of the casing and the cylindrical portion of the casing being joined by a smooth tapered portion, the open end of the cup-shaped control knob terminating adjacent the tapered portion and the tapered portion being provided with a cylindrical flange in the region of the open end of the cup-shaped control knob, the cylindrical flange having a diameter corresponding to the diameter of the cup-shaped control knob and providing a smooth surface between the control knob and the tapered portion.

A still further object is to provide a fluid pressure control device of the above character in which the external surfaces of the casing and the control knob and the spacing between adjacent contiguous surfaces of the casing and the control knob are designed and formed to provide a device having relatively smooth external surfaces free from abrupt edges and large openings between adjacent elements.

Other objects and features of the present invention will appear more fully from the following detailed description considered in connection with the accompanying drawings which disclose a single embodiment of the invention. It is to be expressly understood, however, that the drawings are designed for purposes of illustration only and not as a definition of the limits of the invention, reference for the latter purpose being had to the appended claim.

In the drawings, in which similar reference characters denote similar elements throughout the several views:

Figure 1 is a side elevational view of a fluid pressure regulating device constructed in accordance with the principles of the present invention;

Figure 2 is an end elevational view of the regulating device shown in Figure 1;

Figure 6 is an exploded view of a portion of the regulating device.

Figure 3:
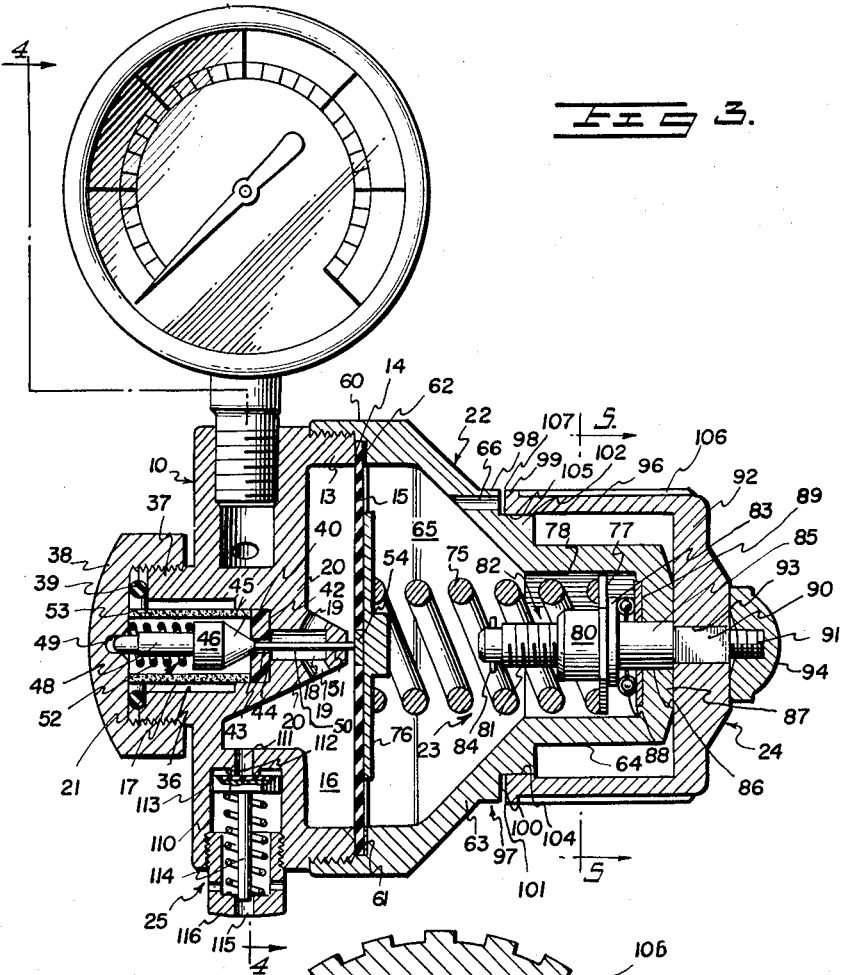
Figure 3 is a view in section taken along the line 3—3 of Figure 2.
Figure 5:
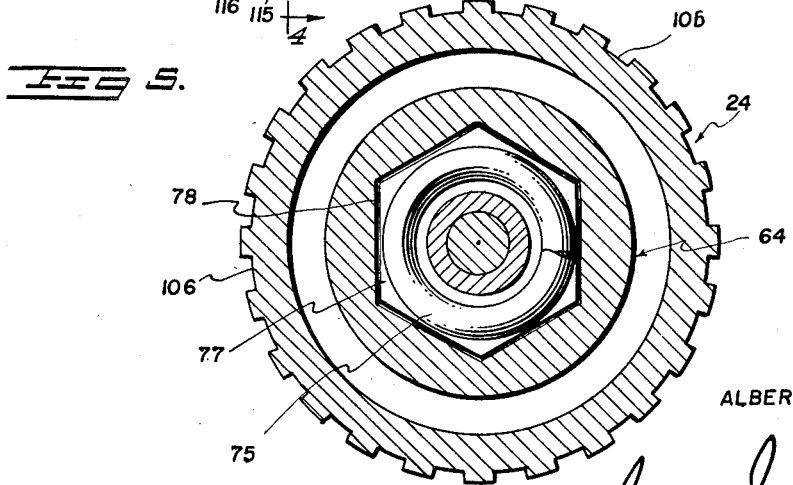
Figure 5 is an enlarged view, in section, taken along the line 5—5 of Figure 3.

It is contemplated by the present invention to provide a fluid pressure control device of the type operable in accordance with a manually applied function comprising an apparatus positioned within a casing to be effected by the manual function, such as the regulator of a source of fluid pressure, and means for operating the mechanism responsively to a manual operation. The last-named means includes a mechanism housed within the casing and operatively connected with the apparatus, and a control means without the casing and operatively coupled to the mechanism for operating the mechanism from without the casing upon manual manipulation of the control means. The control means and the mechanism are cooperatively designed with respect to each other and with respect to the associated portions of the casing to provide an over-all structure of simple, compact construction capable of providing accurate and reliable adjustments with relative ease.

With reference more particularly to Figures 1, 2, 3 and 4 of the drawings, a fluid pressure regulating device embodying the principles of the present invention is disclosed therein including a casing or body portion 10 provided with an inlet passage 11 and an outlet passage 12. A circumferential wall 13 extends outwardly from one side of the casing 10 and terminates in a coplanar annular end face 14 providing a peripheral support for one side of a diaphragm 15. The diaphragm 15 cooperates with the circumferential wall 13 and the central portion of the casing 10 to form a chamber 16 communicating with the outlet passage 12. The inlet passage 11 extends inwardly of the casing and communicates with a centrally positioned high pressure valve chamber 17 formed in the casing by a longitudinal bore extending into the side of the casing opposite the circumferntial wall 13. A central passageway 18 joined to radial ports 19, 19, are provided in the wall 20 of the casing 10 separating the chambers 16 and 17 to provide for fluid flow between the latter chambers. A valve means 21 is positioned in the valve chamber 17 and is operable to control fluid flow through the passageway 18. A shell or bonnet 22 is secured to the circumferential wall 13 and encloses the other side of the diaphragm 15. The shell 22 houses a regulating means 23 which is operable to control the valve means 21 by means of a control knob 24. A safety valve device 25 is positioned in the casing 10 in communication with the chamber 16.

Figure 4:
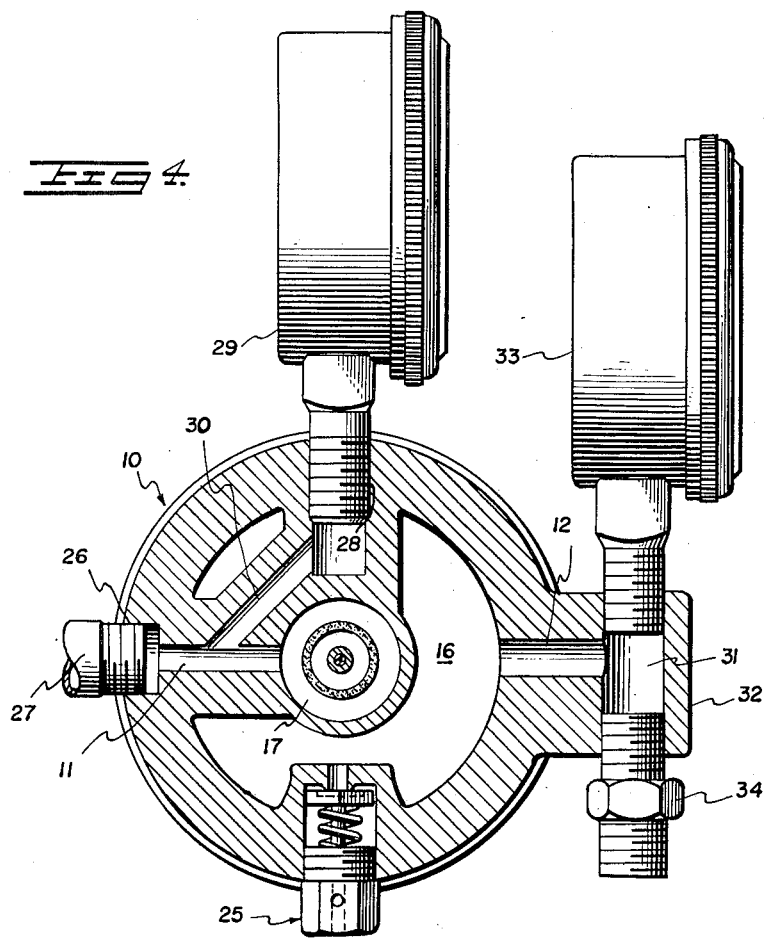
Figure 4 is a view in section taken along the line 4—4 of Figure 3.
Figure 5:
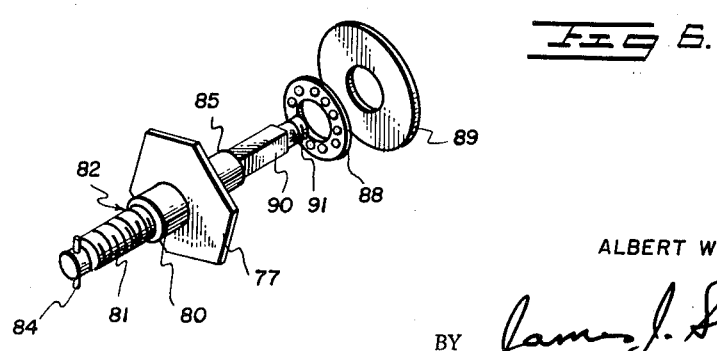

As shown more clearly in Figure 4, the casing 10 is provided with a suitable fitting, such as a threaded bore 26, for connecting a conduit 27, adapted to carry high pressure fluid to be regulated in communication with the inlet passage 11. The casing is also provided with a threaded bore 28 for receiving a fluid pressure gauge 29. A passageway 30 is provided between the inlet passage 11 and the bore 28 so that the gauge 29 indicates the pressure of the fluid fed to the regulating device. The outlet passage 12 communicates with a bore 31 formed in a manifold 32 which may be cast integrally with the casing 10. One end of the bore 31 is threaded to receive a gauge 33 which is operable to indicate the fluid pressure at the outlet passage, while the other end of the bore 31 is threaded to receive outlet coupling 34.

The valve chamber 17 is formed by means of a bore 36 centrally positioned on the casing with its longitudinal axis perpendicular to the surface of the diaphragm. The outer end of the bore 36 passes through a cylindrical portion 37 extending outwardly from the casing 10. The extension 37 is provided with external threads for receiving a cap 38, an annular gasket 39 is provided between the cap and the end of the extension. The inner end of the bore 36 is joined to a concentric bore 40 of reduced diameter communicating with the central passageway 18. The bores 36 and 40 provide a shoulder 42 for receiving a valve seat 43. The valve seat 43 is provided with a central opening 44 extending between the chamber 17 and the passageway 18. The opening 44 is adapted to receive the tapered end 45 of a valve stem 46. The valve stem is mounted for longitudinal movement into and out of closing engagement with the valve seat by means of a guide member 48 slidably mounted in a bore 49 provided in the cap 38, and a valve actuating rod 50 extending forwardly of the valve stem, through the passageway 18 and through an opening 51 provided in the wall 20 of the casing 10. A helical spring 52 is positioned in the chamber 17 between the cap 38 and the valve stem 46 to urge the tapered portion 45 of the valve stem into engagement with the periphery of the opening 44 of the valve seat, and thus normally close the passageway for fluid flow from the chamber 17 to the chamber 16. A cylindrical filter 53, which may be formed from metal of high porosity, is positioned in the chamber 17 extending between the valve seat 43 and the cap 38 to filter the fluid prior to passing through the valve opening. The free end of the valve actuating rod 50 terminates beyond the wall 20 and is adapted to contact a central portion 54 of the diaphragm 15. With this arrangement, movement of the diaphragm 15 to the left, as viewed in the drawing, will open the valve means 21 against the action of the spring 52 and the force exerted on the opposite side of the diaphragm by the fluid pressure in the chamber 16.

The shell 22 is provided with a large diameter portion 60 threadably joined to the outer surface of the circumferential wall 13 of the casing 10. The portion 60 presents an internal coplanar annular surface 61 parallel to the end face 14 which cooperates with the end face 14 to clamp the diaphragm 15 therebetween. An annular washer 62 may be provided on the shell side of the diaphragm as a bearing surface for the annular surface 61 when the shell is threaded onto the casing. The shell 22 also includes a cylindrical tapered portion 63 having its large diameter end joined to the portion 60 and its small diameter end emerging into a cup-shaped end portion 64. The shell 22 thus cooperates with the diaphragm 15 to form a chamber 65 on the side of the diaphragm opposite the chamber 16. The chamber 65 is vented to the atmosphere through vent port 66, and provides an enclosure for housing means operable by the control knob 24 to regulate the valve 21 and thus control the pressure of the fluid in the chamber 16.

The regulating means includes a loading spring 75 positioned in the chamber 65 between the diaphragm 15 and the cup-shaped end portion 64 of the shell 22. One end of the loading spring is in abutting relation with the surface of an overlying disk 76 on the diaphragm 15, while its other end extends into the cup-shaped end portion 64 and pushes against a plate 77 mounted perpendicular to the longitudinal axis of the loading spring. An arrangement is provided for controllably moving the plate 77 axially of the loading spring to increase or decrease the tension of the loading spring and thus control the fluid pressure in the chamber 16. For this purpose, the plate 77 is provided with a hexagonal perimeter and the interior surface 78 of the cup-shaped end portion 64 is formed to provide a hexagonal opening similar to the shape of the plate 77 but of slightly larger size to receive the plate 77 for only sliding movement therein axially of the loading spring. The plate 77 is rigidly secured to a sleeve 80 threadably supported on a threaded portion 81 of a shaft 82 so that the plate 77 moves axially of the shaft upon rotation of the shaft in one direction or the other. A stop plate 83 is secured to the shaft 82 adjacent one end of the threaded portion 81 to limit the movement of the sleeve 80 in one direction, and a stop pin 84 is provided adjacent the other end of the threaded portion to limit movement of the sleeve 80 in the other direction. On the opposite side of the stop plate 83, the shaft includes a non-threaded cylindrical portion 85 which is adapted to pass through a suitable opening 86 in the end wall 87 of the cup-shaped end portion 64 to rotatably mount the shaft relative to the shell 22. A thrust bearing is positioned between the stop plate 83 and the inside surface of the end wall 87 in order to provide for relatively easy rotation of the shaft 82 in the presence of high pressures axially applied to the shaft by the loading spring. For this purpose, a ball bearing type of antifriction bearing 88 may be positioned between the plate 83 and a thrust bearing plate 89 inserted in the inside surface of the end wall 87.

The cylindrical portion 85 of the shaft 82 passes through the opening 86, and the portion of the shaft extending outwardly beyond the outside surface of the end plate 87 includes a square shank portion 90 and a threaded end 91. The end portion 92 of the control knob 24 is provided with a centrally located opening 93 of square configuration for receiving the square shank 90 of the shaft 82. The shank portion has a length corresponding to the thickness of the end portion 92, and a cap nut 94 threadably attached to the threaded end 91 of the shaft to secure the control knob 24 in operative relation with the shaft.

The control knob 24 is cup-shaped and includes a cylindrical side wall 96 extending from the periphery of the end plate 92, in substantially perpendicular relation therewith and in a direction toward the tapered portion 63 of the shell 22, and terminating at an end 99 provided with a coplanar end face 101 substantially perpendicular to the axis of the shaft. In the region of the terminating end face 101 of the cylindrical side wall 96 the tapered portion 63 is provided with a circumferential outwardly extending projection 97 of angular cross-section. The projection 97 includes an external cylindrical surface 98 coextensive with the outer cylindrical surface of the side wall 96 at its terminating end 99, and an annular surface 100 perpendicular to the external surface 98 and parallel to and in contiguous relation with the end surface 101. The tapered portion 63 is provided with a second projection 102 located between the projection 97 and the cup-shaped end portion 64. The projection 102 is also of angular cross-section and provides an external cylindrical surface 104 substantially parallel to the side wall 96 and in contiguous parallel relation with an interior surface 105 at the terminating end of the cup-shaped control knob 24. The control knob may also be provided with a plurality of angularly spaced longitudinally extending recesses 106 on the exterior surface of its side wall 96 as an aid for positively gripping the control knob.

As shown clearly in the drawings, the casing of the fluid pressure control device, illustrated in the form of a fluid pressure regulator, includes the casing 10 and the shell 22, the shell including the cylindrical portion 60, the tapered portion 63 and the cup-shaped end portion 64. The cup-shaped end portion 64 is of reduced cross-sectional area and functions as a housing for a portion of the mechanism for controlling and determining the value of pressure to be maintained. The provision of a cup-shaped end portion of reduced cross-sectional area, into which the loading spring extends and through which the control shaft 81 passes, provides a structure which lends to the provision of a cup-shaped control knob 24 positioned over the cup-shaped end portion 64 in overlying relation with its end 99 terminating in contiguous relation with the tapered portion. In the region of the terminating end 99 of the control knob, the tapered portion 63 is provided with the circumferential flange 97. The circumferential flange 97 provides a smooth surface between the cup-shaped control knob and the tapered portion of the shell so that the control device is provided with smooth transition surfaces between the surfaces of the various elements. Also, the adjacent surfaces of the flange 97 and the terminating end of the control knob are in parallel, contiguous relation substantially excluding the entrance to within the cup-shaped control knob of foreign particles that would tend to render the device difficult to operate or inoperative. Moreover, the projection 102 provides a bearing surface for the open end of the cup-shaped control knob which improves its ease of operation as well as increasing the strength of the assembly. The foregoing construction provides an extremely compact arrangement and presents a control knob which possesses an extremely large hand engaging area relative to the size of the device.

The safety valve 25 includes cylindrical chamber 110 formed in the casing 10 and connected to the chamber 16 by means of a passageway 111. The periphery of the passageway 111 at its end adjacent the cylinder 110 is raised to provide a valve seat 112. A piston valve 113 is provided with a valve stem 114 slidably mounted in a suitable opening 115 in a valve cap 116, and a helical spring 117 is positioned between the piston 113 and the valve cap 116 for urging the piston to its normal position in contact with the valve seat. The valve cap 116 is threadably mounted in the cylindrical chamber for adjusting the tension of the spring to determine the pressure in the chamber 16 required to operate the valve. Upon operation, the valve piston moves downwardly, as viewed in the drawing, away from the valve seat 112, and fluid flows through the passageway 111, around the periphery of the piston 113 and out of the ports in the cap 116.

In operation of the regulating device described above, a source of fluid under a relatively high pressure is connected to the inlet passage 11 by means of a conduit 27, and the outlet passage 12 is connected through a suitable conduit connected to the coupling 34 to a utilization device requiring the fluid under a relatively low pressure of predetermined magnitude. The source of high pressure may comprise a cylinder containing high pressure gaseous oxygen and the utilization device may consist of any oxygen consuming device requiring relatively lower pressure gaseous oxygen of predetermined value, such as cutting or welding equipment or medical apparatus. The high pressure fluid flows through the passageway 30 to the gauge 29 which indicates the magnitude of this pressure. The gauge 33, being in communication with the outlet passage 12, indicates the pressure of the fluid fed to the utilization device.

When the control knob 24 is rotated fully in a counterclockwise direction the plate 77 is in abutting relation with the stop plate 83 and the loading spring 75 is under minimum compression. In this position of the control knob 24 the valve 21 is urged into closed position shown by the spring 52 and there is no fluid flow between the inlet and outlet passages. When it is desired to supply fluid under a predetermined pressure to the chamber 16, and hence to the utilization device, the control knob 24 is rotated in a clockwise direction to move the sleeve 80 and the plate 77 along the threaded portion 81 to the left, as viewed in the drawing, to thereby increase the compression of the loading spring. As the compression of the loading spring is increased, the diaphragm 15 is moved to the left causing the valve actuating rod 50 to move therewith and open the valve 21 and allow flow of high pressure fluid into the chamber 16. Fluid will continue to flow into the chamber 16 until the pressure in the chamber builds up to a value such that the force exerted on the diaphragm 15 by the fluid in the chamber 16 and the force of the spring 52 overcomes the force applied to the diaphragm by the compression of the loading spring. When this condition occurs the diaphragm 15 moves to the right allowing the valve 21 to close by the action of the spring 52. As the fluid is utilized, the pressure in the chamber 16 will fluctuate causing corresponding fluctuations in the movement in the diaphragm 15 and resulting opening and closing of the valve 21 to maintain a substantially constant pressure in the chamber 16 as determined by the setting of the control knob 24. The regulated pressure is proportional to the compression of the loading spring, and therefore the pressure fed to the utilization device may be increased or decreased, as desired, by merely rotating the control knob in the proper direction until the desired pressure which is indicated on the gauge 33.

The pin 84 functions as a stop to limit movement of the sleeve 80 along the threaded portion 81 and thus limits the maximum compression of the loading spring 75 and the maximum pressure that may be delivered by the regulating device. When the maximum compression of the loading spring is set upon consideration of the characteristics of the utilization device, it constitutes an essential safety feature operable to prevent unintentional operation of the regulating device and supplying fluid under an excessive pressure to the utilization device which may effect permanent injury to the utlization device or create a dangerous operating condition.

Another safety feature comprises the safety valve 25 which functions to vent the chamber 16 to atmosphere when the pressure in the chamber 16 exceeds a maximum value which may occur due to malfunction of the utilization device or the pressure regulating device, or in the presence of excessive pressure being supplied to the regulating device.

Although the present invention is disclosed in the form of a fluid pressure regulating device, it is expressly understood that the principles of the invention may be employed in connection with other fluid pressure control devices in which a function, manual or otherwise, is applied from without the casing of the device to a mechanism within the casing.

Although only one embodiment of the invention has been disclosed and described herein, it is expressly understood that various changes and substitutions may be made therein without departing from the spirit of the invention as well understood by those skilled in the art. Reference will be had to the appended claim for a definition of the limits of the invention.

What is claimed is:

A fluid pressure control device comprising a body having an inlet passage and an outlet passage and a passageway interconnecting the inlet and outlet passages, valve means in the passageway for controlling the flow of fluid between the passages through the passageway, means for controlling the valve means including a diaphragm carried by the body and operatively associated with the valve means and having one of its sides subject to the pressure of the outlet passage, a shell joined to the body and generally enclosing the space on the other side of the diaphragm, the shell including a first wall portion of relatively large diameter having one end joined to the body adjacent the periphery of the diaphragm and a central cup-shaped end portion of relatively small diameter opening toward the diaphragm and a second wall portion extending between the other end of the first wall portion and the inner end of the cup-shaped end portion, a loading spring disposed in the shell with one end of the spring acting against the other side of the diaphragm and with the other end of the spring extending into the cup-shaped end portion of the shell, a shaft extending through the outer end of and supported for rotation in but fixed against axial movement relative to said outer end of the cup-shaped end portion, an abutment member supported on the shaft between the other end of the spring and the outer end of the cup-shaped end portion with said other end of the spring acting against the diaphragm side of the abutment member, means for moving the abutment member axially of the shaft upon rotation of the shaft, a cup-shaped control knob secured to the shaft outside the cup-shaped end portion of the shell for rotating the shaft, the cup-shaped control knob opening toward the diaphragm and having cylindrical side walls surrounding the cup-shaped end portion of the shell and of a diameter less than the diameter of said first wall portion of the shell, the shell having an outer cylindrical surface coaxial with the shaft and in sliding contact with an inner cylindrical surface of the diaphragm end of the control knob, said cylindrical surface of the shell terminating toward the diaphragm in a radially outwardly extending annular surface on said second wall portion of the shell which confronts and is closely spaced from the diaphragm end of the control knob, the shell having a vent opening which extends through said second wall portion of the shell and opens away from the diaphragm through said annular surface toward the diaphragm end of the control knob between the inner and outer contours of the cylindrical side walls of the control knob.

References Cited in the file of this patent

UNITED STATES PATENTS

| | | |
|---|---|---|
| 99,001 | Powell | Jan. 18, 1870 |
| 959,458 | Carroll | May 31, 1910 |
| 2,057,150 | Kehl | Oct. 13, 1936 |
| 2,342,659 | Grove | Feb. 29, 1944 |
| 2,638,113 | Sturmer | May 12, 1953 |
| 2,670,172 | Moore | Feb. 23, 1954 |
| 2,687,140 | St. Clair | Aug. 24, 1954 |